United States Patent
Bernardele (10) Patent No.: US 10,696,358 B2
(45) Date of Patent: Jun. 30, 2020

(54) ELECTRIC BICYCLE DERAILLEUR

(71) Applicant: CAMPAGNOLO S.r.l., Vicenza (IT)

(72) Inventor: Davide Bernardele, Caldogno (VI) Vicenza (IT)

(73) Assignee: Campagnolo S.r.l., Vicenza (IT)

( * ) Notice: Subject to any disclaimer, the term of this patent is extended or adjusted under 35 U.S.C. 154(b) by 316 days.

(21) Appl. No.: 15/608,678

(22) Filed: May 30, 2017

(65) Prior Publication Data

US 2017/0341708 A1     Nov. 30, 2017

(30) Foreign Application Priority Data

May 31, 2016   (IT) .............................. UA2016A3996

(51) Int. Cl.
*B62M 9/122*    (2010.01)
*B62M 9/12*     (2006.01)
*B62M 9/132*    (2010.01)
*B62M 25/08*    (2006.01)

(52) U.S. Cl.
CPC .............. *B62M 9/122* (2013.01); *B62M 9/12* (2013.01); *B62M 9/132* (2013.01); *B62M 25/08* (2013.01)

(58) Field of Classification Search
CPC ....... B62M 9/122; B62M 9/132; B62M 25/08
See application file for complete search history.

(56) References Cited

U.S. PATENT DOCUMENTS

| | | | |
|---|---|---|---|
| 2004/0176895 A1* | 9/2004 | Takeda | B62M 25/045 |
| | | | 701/51 |
| 2006/0183584 A1 | 8/2006 | Fukuda | |
| 2012/0258827 A1 | 10/2012 | Ishikawa | |
| 2013/0203532 A1 | 8/2013 | Jordan | |
| 2014/0121047 A1* | 5/2014 | Katsura | B62M 9/122 |
| | | | 474/80 |
| 2014/0162817 A1* | 6/2014 | Yamaguchi | B62M 9/122 |
| | | | 474/80 |

(Continued)

FOREIGN PATENT DOCUMENTS

| | | |
|---|---|---|
| CN | 104554605 A | 4/2015 |
| CN | 104608873 A | 5/2015 |

(Continued)

OTHER PUBLICATIONS

Italian Search Report and Written Opinion in Italian Application No. UA2016A003996, dated Jan. 26, 2017, with English translation.

(Continued)

*Primary Examiner* — Michael R Mansen
*Assistant Examiner* — Mark K Buse
(74) *Attorney, Agent, or Firm* — Volpe and Koenig, P.C.

(57) ABSTRACT

A bicycle derailleur comprising a chain guide, an electric motor that displaces the chain guide and an electrically controllable device configured to, selectively, block the rotation of the electric motor and let the electric motor free to rotate. A method for actuating a bicycle derailleur comprising a chain guide and an electric motor that displaces the chain guide, comprises the steps of: receiving a gearshifting request signal; making the electric motor free to rotate; driving the electric motor to displace the chain guide until the chain guide is in an intended position while the electric motor is made free to rotate; and, blocking the rotation of the electric motor.

18 Claims, 9 Drawing Sheets

(56) References Cited

U.S. PATENT DOCUMENTS

| | | | |
|---|---|---|---|
| 2014/0162818 A1* | 6/2014 | Yamaguchi | F16H 61/68 474/80 |
| 2014/0213397 A1* | 7/2014 | Yamaguchi | B62M 9/122 474/80 |
| 2015/0126314 A1 | 5/2015 | Pasqua | |
| 2017/0253296 A1 | 9/2017 | Shipman et al. | |
| 2018/0274623 A1* | 9/2018 | Brown | B62M 9/128 |

FOREIGN PATENT DOCUMENTS

| | | |
|---|---|---|
| CN | 105134938 A | 12/2015 |
| EP | 1010612 A1 | 6/2000 |
| EP | 2727810 A2 | 5/2014 |
| JP | 2713601 | 2/1998 |

OTHER PUBLICATIONS

Office Action dated Mar. 26, 2020 in corresponding Chinese Application CN 201710397436.2.

* cited by examiner

ELECTRIC BICYCLE DERAILLEUR

CROSS REFERENCE TO RELATED APPLICATION

This application claims the benefit of Italian Application No. UA2016A003996, filed on May 31, 2016, which is incorporated herein by reference as if fully set forth.

FIELD OF INVENTION

The present invention relates to an electric bicycle derailleur and in particular to a derailleur of an electronically servo-assisted gearshift—hereinafter briefly referred to as electronic gearshift.

BACKGROUND

A motion transmission system in a bicycle comprises a chain extending between toothed wheels associated with the axle of the pedal cranks and with the hub of the rear wheel. When there is an assembly of toothed wheels comprising more than one toothed wheel at at least one of the axle of the pedal cranks and the hub of the rear wheel, and the motion transmission system is therefore provided with a gearshift, a front derailleur and/or a rear derailleur are provided for.

In case of an electronic gearshift, each derailleur of the transmission system comprises a guide element—also known as chain guide or cage or, in case of a rear derailleur, rocker arm—movable to displace the chain among the toothed wheels, and an electromechanical actuator to displace the chain guide.

The actuator typically comprises a motor, typically an electric motor, coupled with the chain guide through a linkage, such as an articulated parallelogram, a rack system or a worm screw system. Typically, the electric motor is provided with a gear reduction mechanism. The assembly of electric motor and gear reduction mechanism is referred to hereinafter as motor gear (or geared motor). The actuator typically further comprises a sensor or transducer of the position, speed, acceleration and/or direction of rotation of the rotor or of any moving part downstream of the rotor, down to the chain guide itself.

Control electronics changes the gear ratio automatically, for example based on one or more detected variables, such as the travel speed, the cadence of rotation of the pedal cranks, the torque applied to the pedal cranks, the slope of the travel terrain, the heart rate of the cyclist and similar, and/or the gear ratio is changed based on commands manually input by the cyclist through suitable control members, for example levers and/or buttons, typically provided on one or two manual command devices mounted to the bicycle.

The motor gear of the derailleur is sized to withstand the external stresses, including the force exerted on it by the tension of the chain. During use of the bicycle, the vibrations, impacts and/or other stresses of the chain and/or of the chain guide can apply an excessive force on the motor gear. If such a force is not suitably counteracted, it can cause the involuntary or "passive" displacement of the motor gear, if not actually damage thereof. An involuntary displacement of the motor gear and of the chain causes greater friction with the engaged toothed wheels, and possibly even causes the chain to fall or an involuntary change of the gear ratio. Furthermore, it can cause problems during subsequent gearshifting due to the misalignment between what the control electronics assumes to be the position of the derailleur and the actual position. On the other hand, an oversizing of the motor gear is disadvantageous in terms of bulk, weight and cost.

EP 2 727 810 A2 discloses an electric derailleur motor unit with a self-lock function, that includes: a base member; a motor mounted to the base member, the motor having a motor shaft rotatable about a first rotational axis; an output shaft rotatable about a second rotational axis; and a drive train operatively disposed between the motor shaft of the motor and the output shaft, the drive train including an anti-reverse clutch, the anti-reverse clutch being configured to transmit rotation of the motor shaft of the motor in both rotational directions about the first rotational axis to the output shaft, and the anti-reverse clutch being further configured to prevent the output shaft from rotating in both rotational directions about the second rotational axis while the output shaft receives an external rotational torque from outside of said electric derailleur motor unit.

More in particular, the anti-reverse clutch includes a clutch case mounted to the base member, an input member rotatable with respect to the clutch case, the input member being operatively coupled to the motor shaft of the motor, an output member rotatable with respect to the clutch case, the output member being operatively coupled to the output shaft, and an engagement element operatively disposed between the clutch case and the output member.

In the case of use, within said EP 2 727 810 A2, of an anti-reverse clutch according to JP 2713601, the engagement element has a plurality of rollers radially disposed between the clutch case and the output member. The rollers are arranged to lock the output member with respect to the clutch case in both rotational directions about a rotational axis of the output member unless there is drive from the input member. On the other hand, the rollers are arranged to release the output member with respect to the clutch case when there is drive from the input member in either rotational direction about a rotational axis of the input member. Furthermore, if the input member rotates further, then the input member is directly connected to the output member to transmit rotation of the input member to the output member.

As an alternative, EP 2 727 810 A2 provides for using an anti-reverse clutch wherein, when an input member of the anti-reverse clutch is rotated, then an output member of the anti-reverse clutch also rotates; on the other hand, if an external rotational torque from outside the anti-reverse clutch in both rotational directions is exerted to the output member, then the output member can freely rotate with respect to the input member, and the rotational torque is not transmitted from the output member to the input member.

EP 2 727 810 A2 further discloses bicycle derailleur motor gear unit configured to reduce motor speed of a motor and transmit motor torque of the motor to a derailleur, the bicycle derailleur motor gear unit comprising: an output shaft; a fixed sun gear; an output sun gear rotatable relative to the fixed sun gear, the output sun gear being fixedly coupled to the output shaft; a plurality of planet gears; and a carrier rotatably and revolvably supporting the planet gears; each of the planet gears having a first gear that engages with the fixed sun gear and a second gear that engages with the output sun gear, the first gear and the second gear being coaxially coupled to each other; the fixed sun gear, the output sun gear, the first gear, and the second gear having tooth counts, respectively, such that the fixed sun gear, the output sun gear, the first gear, and the second gear lock while an external force is exerted to the output sun gear. Therefore, the rotation of the motor responsive to the operation of a switch is transmitted from the output shaft to the chain guide to perform a shift change, but when the force from the chain is added to the chain guide, the planetary gear reduction mechanism self-locks, stopping rotation and takes the stress. Consequently, the chain guide is retained at its original position, and an unintended shift change does not occur.

With regard to this second solution of such a document, the Applicant observes that the motor gear has a low efficiency, due to the large number of toothed couplings. Furthermore, the required relationship between the number of teeth of the various gears greatly limits the freedom to design the motor gear.

With regard to the first solution of such a document, the Applicant observes that an anti-reverse clutch like the one described above has a quite complex construction and in which the sizing is very critical; furthermore, such a clutch is delicate due to the return elements housed within the clutch case.

The technical problem underlying the present invention is to provide a derailleur that is not subject to involuntary displacement without imposing particular design constraints on the motor gear of the derailleur.

SUMMARY

In one aspect, the invention relates to a bicycle derailleur comprising a chain guide and an electric motor that displaces the chain guide, characterized by further comprising an electrically controllable device configured to, selectively, block the rotation of the electric motor and let the electric motor free to rotate.

Preferably, the motor is part of a motor gear further comprising at least one gear and preferably a gear train.

Preferably, the electric motor has a motor shaft rotatable about a first rotation axis, and the motor gear comprises an output shaft rotatable about a second rotation axis, the at least one gear being operatively arranged between the motor shaft of the electric motor and the output shaft.

In embodiments, the electrically controllable device has a stable state of blocking of, and an unstable state of consent for, rotation of the motor.

This configuration has the advantage that the electrically controllable device is supplied with power only during gearshifting.

In other embodiments, the electrically controllable device has an unstable state of blocking of, and a stable state of consent for, rotation of the motor, or an unstable state of blocking of, and an unstable state of consent for, rotation of the motor.

In yet other embodiments, the electrically controllable device has a stable blocking state and a stable state of consent for, rotation of the motor.

Preferably, the electrically controllable device comprises a first toothed member and a second toothed member, the first toothed member being configured to selectively engage the second toothed member, the second toothed member being associated with the motor gear so that the rotation thereof is associated with the rotation of the motor shaft, as well as an electric actuator configured to displace the first toothed member into engagement and out of engagement with the second toothed member.

In the present description and in the attached claims, under associated rotations it is meant that when one of the elements rotates, the other one also rotates and when one of the elements is steady, the other one is also steady, but it is not meant that the rotations are necessarily in the same direction or synchronous.

In an embodiment, said second toothed member rotates integrally with the motor shaft.

This embodiment is particularly advantageous because the actual position of the chain guide undergoes a very small displacement also in the case in which the first toothed member does not actually engage with the desired tooth of the second toothed member, rather engages with an adjacent tooth. Indeed, the actual position of the chain guide is determined by the last toothed member of the gear or of the gear train of the motor gear, and therefore the engagement error between the first and the second toothed member is reduced by the reduction factor of the gear or of the gear train of the motor gear. Furthermore, the torque that must be applied onto the second toothed member to block the rotation of the motor shaft is comparatively low.

In embodiments, said second toothed member is an auxiliary toothed member, namely a toothed member that is not part of the kinematic chain embodied by said at least one gear.

Preferably, said second toothed member rotates integrally with a first end of the motor shaft, said at least one gear comprising a third toothed member integral with a second end of the motor shaft opposite the first end.

Alternatively, the auxiliary toothed member is engaged with a toothed member of said at least one gear.

As another alternative, the auxiliary toothed member could rotate integrally with a toothed member of said at least one gear.

In other embodiments, said second toothed member is a live toothed member of said at least one gear, namely a toothed member that is an active part of the kinematic chain embodied by said at least one gear.

The load toothed member can be the first toothed member of said at least one gear, the last one, or an intermediate one.

Preferably, said first toothed member is formed on a sliding element that is translatable along a direction parallel to a rotation axis of the second toothed member.

Given that the motion of the first toothed member is a translation, advantageously the motion of the second toothed member transmitted by the motor shaft does not have any component that tends to disengage it from the first toothed member.

Preferably, the sliding element is translatable but not rotatable on a sliding shaft having a splined profile, the sliding element being provided with a hole with a splined profile matching that of the sliding shaft.

Alternatively, the sliding element could be sliding on a rail.

In other embodiments, the sliding element is fixed to a sliding shaft.

Preferably the electrically controllable device is mounted to a support that can be fixed to a case of the electric motor of the motor gear.

In other embodiments, the electrically controllable device is fixed externally to a casing of said at least one gear.

In yet other embodiments, the first toothed member and the second toothed member of the electrically controllable device are housed within a casing of said at least one gear.

In embodiments, said first toothed member is an at least partially ferromagnetic element, and said electric actuator of said electrically controllable device comprises an electromagnet.

Preferably, the sliding shaft has an end abutment, the sliding element being arranged between the end abutment of the sliding shaft and a compression spring.

In this way, the electrically controllable device has the aforementioned advantageous configuration wherein it only consumes during the unstable state of consent for the rotation of the motor shaft.

In an embodiment, said first toothed member comprises a ferromagnetic insert.

In other embodiments, said electric actuator of said electrically controllable device comprises a linear electric motor to drive the translation of a sliding shaft carrying said first toothed member.

In other embodiments, said electric actuator of said electrically controllable device comprises a rotary electric motor with worm screw and a member for converting motion from rotary to linear arranged between the worm screw and a sliding shaft carrying said first toothed member.

In embodiments, said member for converting motion from rotary to linear comprises a rack integral with the shaft of the first toothed member and engaged with the worm screw.

In other embodiments, said member for converting motion from rotary to linear comprises a rack integral with the shaft carrying the first toothed member, and at least one gear engaged with the worm screw and with the rack.

In other embodiments, said member for converting motion from rotary to linear comprises an element having a toothed sector engaged with the worm screw, and a hinge coupling with the shaft carrying the first toothed member.

In other embodiments, said member for converting motion from rotary to linear comprises a rack integral with the shaft of the first toothed member, and a bevel gear engaged with the rack and with the worm screw.

Other embodiments of the member for converting motion from rotary to linear are within the capabilities of those skilled in the art in the light of the present disclosure.

In yet other embodiments, said electrically controllable device comprises a piston or other linear actuator. It should be understood that such embodiments are also encompassed within the scope of protection of the claimed invention in that the piston or other linear actuator is in any case subject to an electrical actuation command, in particular coming from a controller.

Preferably, said derailleur further comprises a controller of the electrically controllable device and/or of the electric motor—that of the motor gear where more than one electric motor is present.

In embodiments, the controller comprises components housed on a first electronic board for controlling the controllable device, and components housed on a second electronic board for controlling the electric motor—that of the motor gear where more than one electric motor is present.

Alternatively, the controller comprises components housed on a single electronic board for controlling the electrically controllable device and for controlling the electric motor—that of the motor gear where more than one electric motor is present.

Preferably, the controller of the electric motor—that of the motor gear where more than one electric motor is present—is respondent to a gearshifting request command.

More preferably, the derailleur further comprises a sensor of the position of the chain guide, and said controller of the electric motor—that of the motor gear where more than one electric motor is present—is further respondent to the position sensor.

Preferably, the first and the second toothed member comprise self-engaging teeth.

Alternatively, the first and the second toothed member comprise straight teeth.

Preferably, the controller is configured to carry out the steps of:
  receiving a gearshifting request signal,
  driving the electrically controllable device up to a condition of consent for rotation of the electric motor,
  driving the electric motor to displace the chain guide until the chain guide is in an intended position while the electrically controllable device is in said consent condition, and
  driving the electrically controllable device up to a condition of blocking the rotation of the electric motor.

In the present description and in the attached claims, the expression "drive" the electrically controllable device should be deemed as also encompassing the mere interruption of the excitation of the electrically controllable device, not in a limiting sense to mean delivering an excitation signal.

Preferably, the intended position is verified through an output signal of a sensor of the position of the chain guide.

Preferably, the step of driving the electrically controllable device up to the condition of consent for the rotation of the electric motor comprises exciting the electrically controllable device.

Preferably, the step of driving the electrically controllable device up to a condition of blocking the rotation of the electric motor comprises interrupting the excitation of the electrically controllable device.

In other words, the return of the electrically controllable device into the condition of blocking the rotation of the electric motor is preferably automatic, so as to save electric energy.

Said step of driving the electrically controllable device up to a condition of blocking the rotation of the electric motor can be carried out after said step of driving the electric motor, or simultaneously with a final part of said step of driving the electric motor.

In the second case, it is possible to make a more accurate control of the engagement position of the first and of the second toothed member, and therefore of the position maintained by the chain guide of the derailleur, at the expenses of greater complexity in the control algorithm.

In one aspect, the invention relates to a method for actuating a bicycle derailleur comprising a chain guide, an electric motor that displaces the chain guide, and an electrically controllable device configured for, selectively, blocking the rotation of the electric motor and letting the electric motor free to rotate, comprising some or all of the steps outlined above with reference to the controller.

In one aspect, the invention relates to a method for actuating a bicycle derailleur comprising a chain guide and an electric motor that displaces the chain guide, comprising the steps of:
  receiving a gearshifting request signal,
  making the electric motor free to rotate,
  driving the electric motor to displace the chain guide until the chain guide is in an intended position while the electric motor is made free to rotate, and
  blocking the rotation of the electric motor.

Preferably, the method comprises the step of verifying the intended position through an output signal of a sensor of the position of the chain guide, Preferably, the step of making the electric motor free to rotate comprises exciting an electrically controllable device configured to, selectively, block the rotation of the electric motor and let the electric motor free to rotate.

Preferably, the step of blocking the rotation of the electric motor comprises interrupting the excitation of the or of an electrically controllable device configured to, selectively, block the rotation of the electric motor and let the electric motor free to rotate.

The step of blocking the rotation of the electric motor can be carried out after said step of driving the electric motor or simultaneously with a final part of said step of driving the electric motor.

BRIEF DESCRIPTION OF THE DRAWINGS

Further features and advantages of the present invention will become clearer from the following detailed description made with reference to the attached drawings. The different features illustrated and described with reference to the single configurations can be combined with each other as desired. In the following description, for the illustration of the figures identical or similar reference numerals are used to indicate constructive or functional elements with the same function or analogous function. In the drawings.

DETAILED DESCRIPTION OF THE PREFERRED EMBODIMENTS

Figure 1:
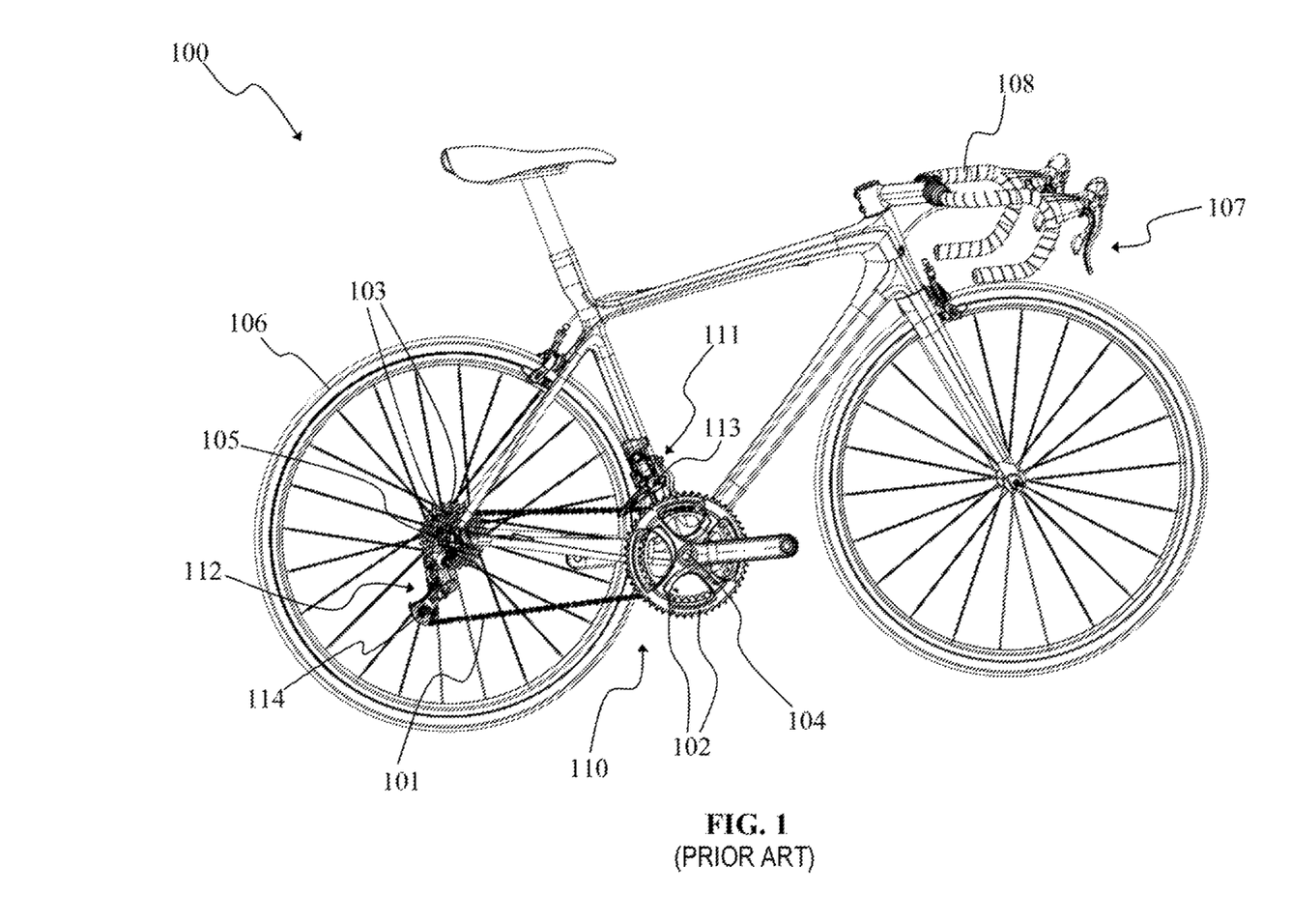
FIG. 1 is a side view of a bicycle equipped with an electronic gearshift according to the prior art.
Figure 2:
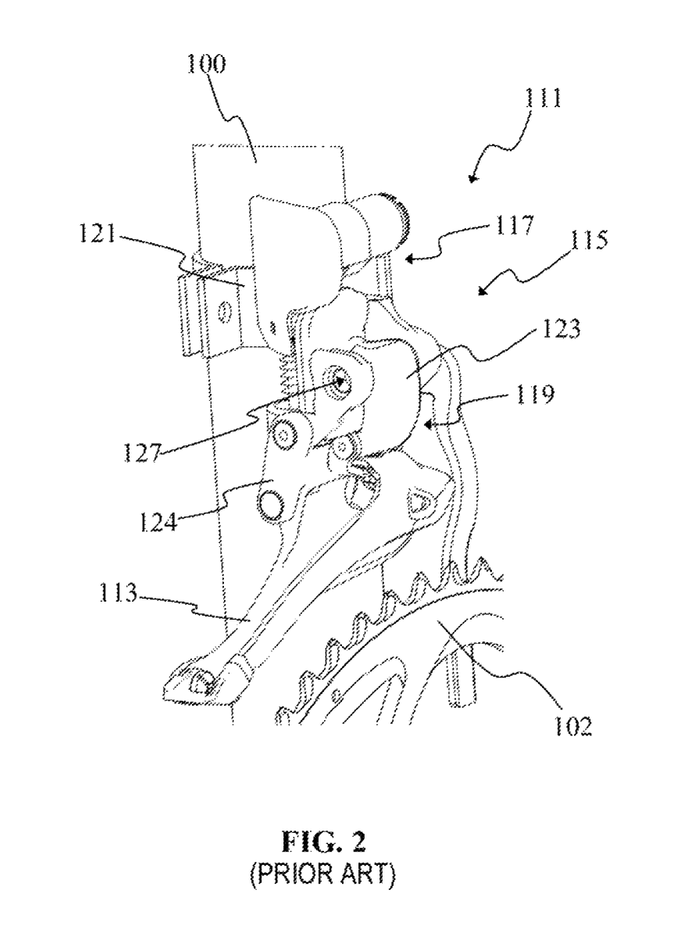
FIG. 2 is a perspective view of a front derailleur according to the prior art, mounted on a tube of a bicycle frame.
Figure 3:
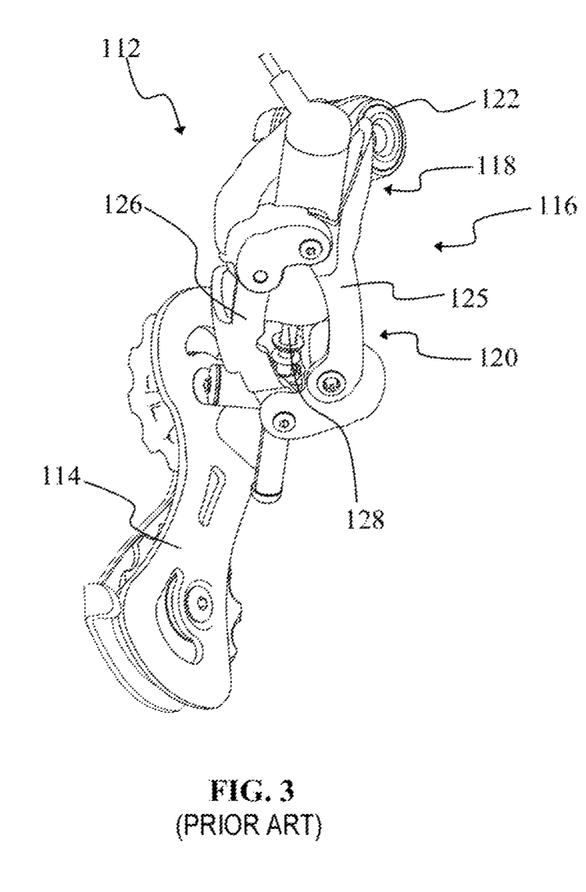
FIG. 3 is a perspective view of a rear derailleur according to the prior art.

With reference to FIGS. 1-3, a motion transmission system in a bicycle 100 comprises a chain 101 extending between toothed wheels 102, 103 associated with the axle of the pedal cranks 104 and with the hub 105 of the rear wheel 106. When—as in the case shown—there is an assembly of toothed wheels 102, 103 comprising more than one toothed wheel 102, 103 at at least one of the axle of the pedal cranks 104 and the hub 105 of the rear wheel 106, and the motion transmission system is therefore provided with a gearshift 110, a front derailleur 111 and/or a rear derailleur 112 are provided for.

In case of an electronic gearshift, each derailleur 111, 112 comprises a guide element 113, 114—also known as chain guide or cage or, in case of a rear derailleur, rocker arm—movable to displace the chain 101 among the toothed wheels 102, 103 in order to change the gear ratio, and an electromechanical actuator 115, 116 to displace the chain guide 113, 114.

The actuator 115, 116 in turn typically comprises a motor typically an electric motor, coupled with the chain guide 113, 114 through a linkage 119, 120, such as an articulated parallelogram as shown, a rack system or a worm screw system. Typically, the electric motor is provided with a gear reduction mechanism. The assembly of electric motor and gear reduction mechanism is referred to hereinafter as motor gear (or geared motor) 117, 118. The actuator typically further comprises a sensor (not shown) or transducer of the position, speed, acceleration and/or direction of rotation of the rotor or of any moving part downstream of the rotor, down to the chain guide 113, 114 itself. It is worthwhile noting that slightly different terminology from that used in this context is also in use.

Those skilled in the art will immediately recognize that the practical construction of the derailleurs 111, 112 and of their actuators 115, 116 can vary substantially from that illustrated, and that FIGS. 1-3 are provided merely as an example of such components.

Control electronics changes the gear ratio automatically, for example based on one or more detected variables, such as the travel speed, the cadence of rotation of the pedal cranks, the torque applied to the pedal cranks, the slope of the travel terrain, the heart rate of the cyclist and similar, and/or the gear ratio is changed based on commands manually input by the cyclist through suitable control members, for example levers and/or buttons, typically provided on one or two manual command devices 107 mounted to the handlebars 108 of the bicycle 100.

In particular, the derailleur 111, 112 includes a support body 121, 122 that is configured to be attached to the frame of bicycle 100 and the chain guide 113, 114 connected to the support body 121, 122 by means of two arms 123, 124, 125, 126, the ends of which are articulated to the support body 121, 122 and to the chain guide 113, 114, to form the articulated parallelogram 119, 120.

The motor gear 117, 118 has an output shaft 127, 128 that drives the articulated parallelogram 119, 120 open and closed, and as a consequence the displacement of the chain guide among the toothed wheels 102, 103.

The motor gear 117, 118 of the derailleur 111, 112 is sized to withstand the external stresses, including the force exerted on it by the tension of the chain 101. However, during use of the bicycle 100, the vibrations, impacts and/or other stresses of the chain 101 and/or of the chain guide 113, 114 can apply, through the linkage 119, 120, an excessive force on the motor gear 117, 118. If such a force is not suitably counteracted, it can cause the involuntary or "passive" displacement of the motor gear 117, 118, if not actually damage thereof. An involuntary displacement of the motor gear 117, 118 and of the chain 101 causes greater friction with the engaged toothed wheels 102, 103, and possibly even causes the chain 101 to fall or an involuntary change of the gear ratio. Furthermore, it can cause problems during subsequent gearshifting due to the misalignment between what the control electronics assumes to be the position of the derailleur 111, 112 and the actual position. On the other hand, an oversizing of the motor gear 117, 118 is disadvantageous in terms of bulk, weight and cost.

Figure 4:
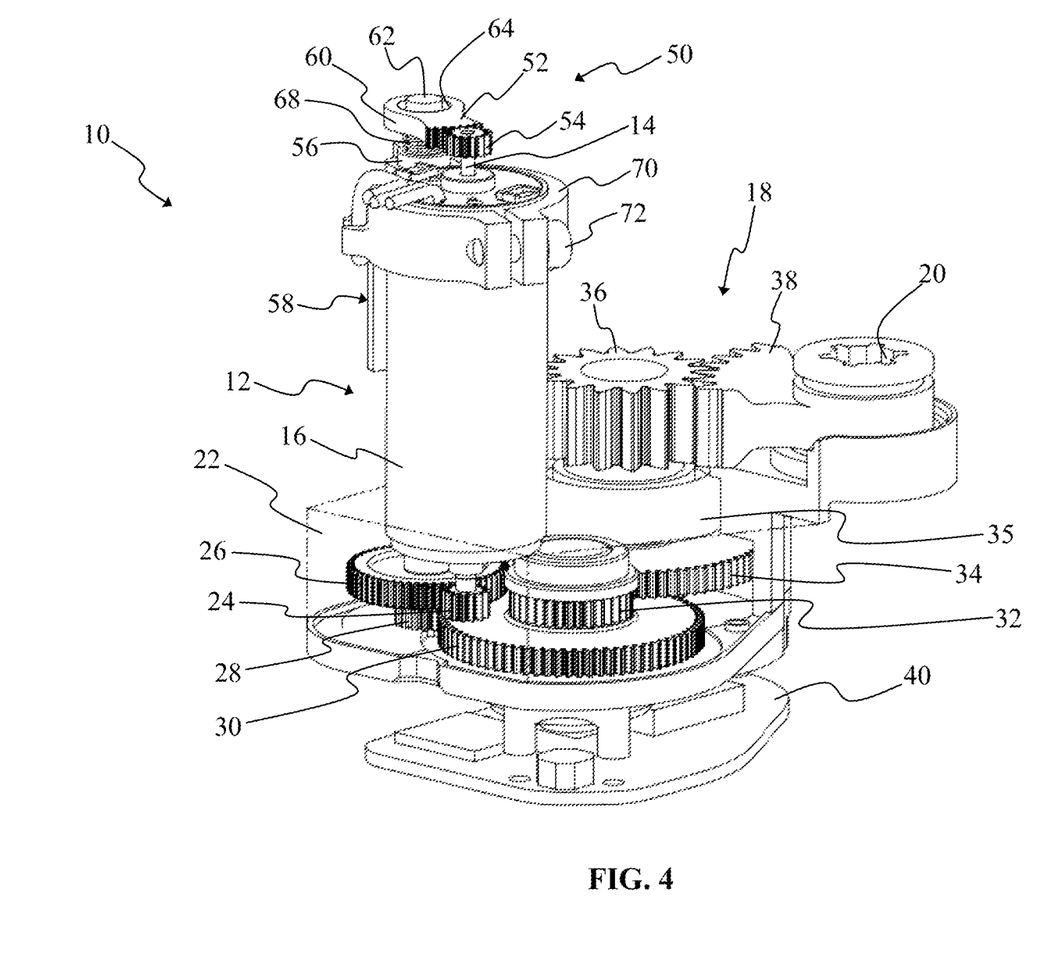
FIG. 4 is a perspective view of a motor gear of a bicycle derailleur with an electrically controllable device according to an embodiment of the invention.
Figure 5:
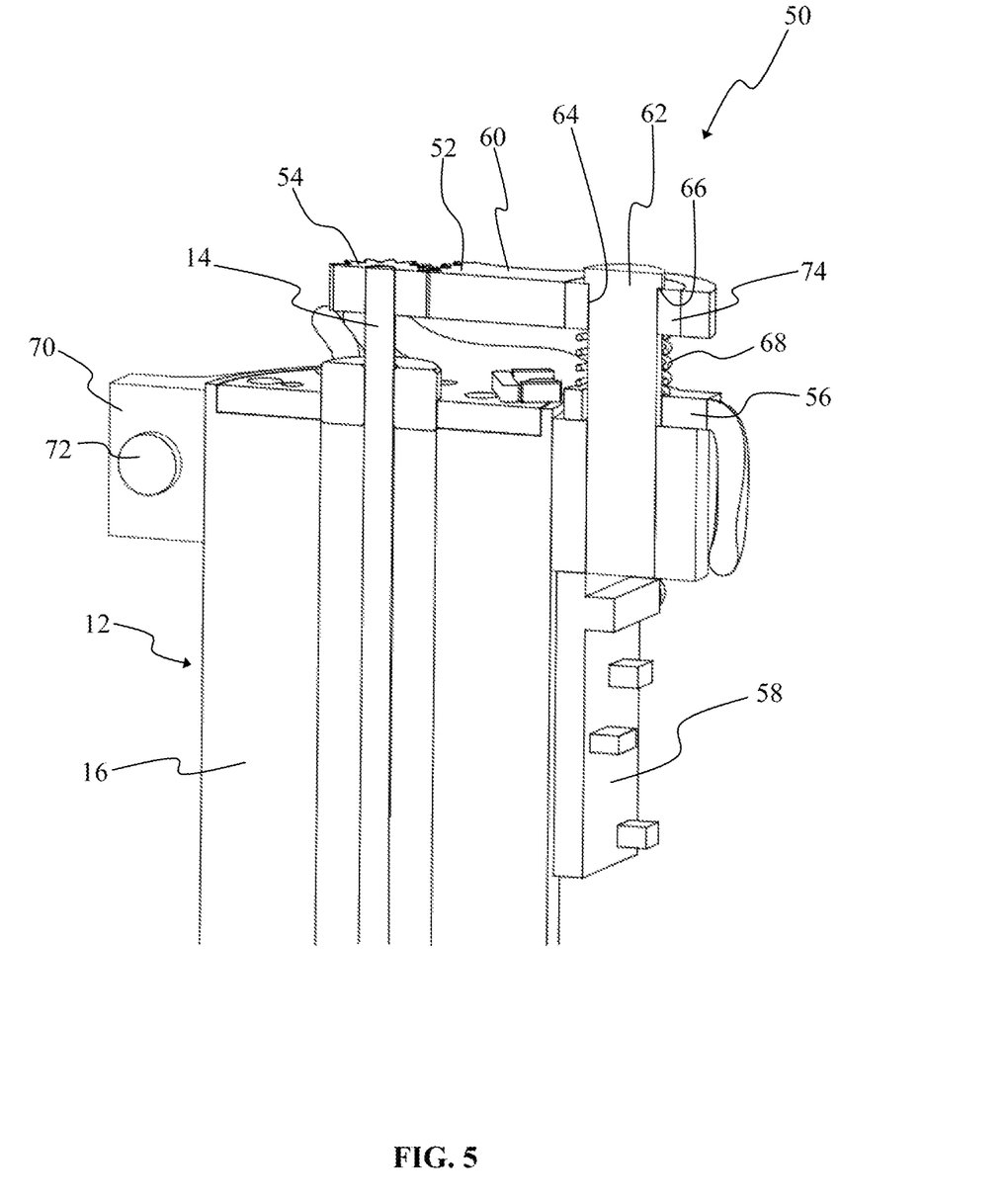
FIG. 5 is a detail of FIG. 4 in sectional perspective view.
Figure 6:
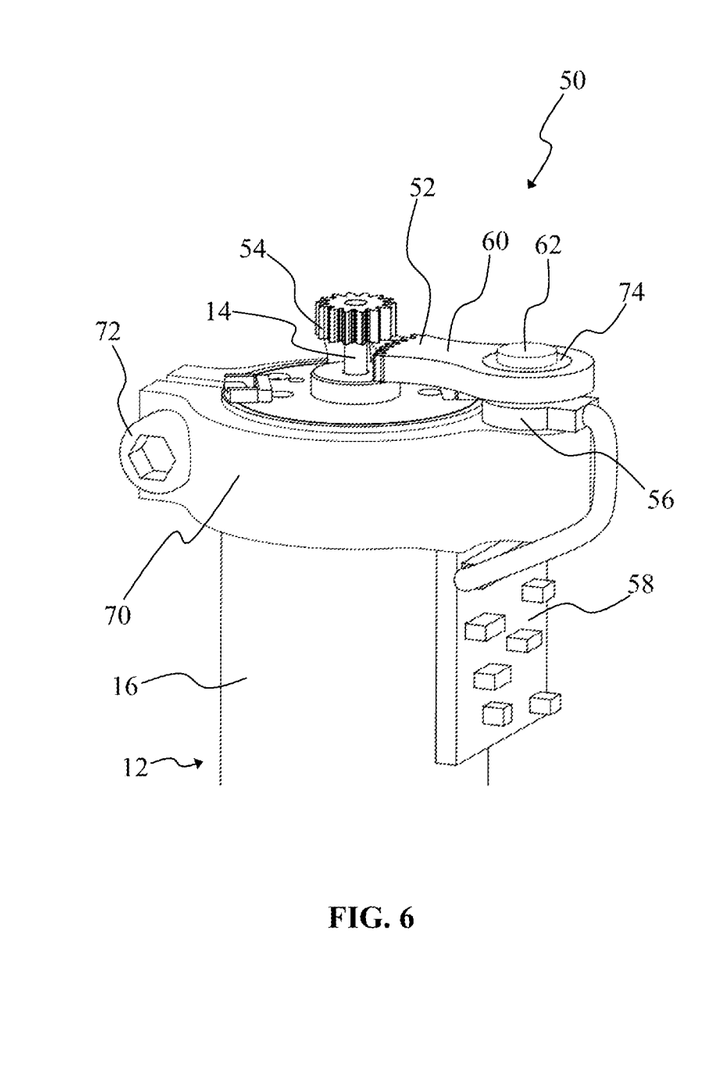
FIG. 6 is a detail of FIG. 4 with the electrically controllable device in a second operating condition.

FIGS. 4-6 show a motor gear 10—which can for example be the motor gear 117, 118 of one of the derailleurs 111, 112 shown in FIGS. 2 and 3, but which can be used in a derailleur even remarkably different therefrom.

The motor gear 10, and in particular an electric motor 12 thereof, is coupled with an electrically controllable device 50 configured to, selectively, block the rotation of the electric motor 12 and let or make the electric motor 12 free to rotate.

The electric motor 12 comprises a motor shaft 14 exiting from a motor case 16, which houses, i.a., a rotor and a stator (not shown).

The motor gear 10 comprises a gear train 18 operatively arranged between the motor shaft 14 of the electric motor 12 and an output shaft (not shown, cf. output shaft 127, 128 of FIGS. 2, 3) of the motor gear 10.

The output shaft could coincide with one of the pivots of the linkage or articulated parallelogram 119, 120 of the derailleur 111, 112, or be differently coupled with the linkage, in a per se known manner.

The output shaft is for example a shaft with a splined profile fitted in a hole 20, having a matching shape, of one of the toothed members of the gear train 18.

The gear train 18 is housed in a casing 22, shown broken away and in part as if it were transparent in FIG. 4.

FIG. 4 furthermore shows a board 40 for electronic circuits housing components that embody a controller of the electric motor 12.

As described in the introductory part of the present application, the controller of the electric motor 12 is respondent to a gearshifting request signal emitted by a cyclist or by an electronic control unit, as well as preferably to a sensor (not shown) or transducer of the position, speed, acceleration and/or direction of rotation, of the rotor or of any moving part downstream of the rotor of the electric motor 12, up to the chain guide 113, 114 itself.

In the embodiment shown in FIGS. 4-6, the electrically controllable device 50 according to the invention comprises a first toothed member 52 and a second toothed member 54.

The first toothed member 52 is configured to selectively engage the second toothed member 54.

The second toothed member 54 is associated with the motor gear 10, so that the rotation thereof is associated with the rotation of the motor shaft 14.

The electrically controllable device 50 comprises an electric actuator 56 configured to displace the first toothed member 52 into engagement and out of engagement with the second toothed member 54, better described hereinafter.

A second board 58 for electronic circuits housing components that embody a controller of the electrically controllable device 50, and in particular of its electric actuator 56, is also shown.

In the embodiment shown in FIGS. 4-6, the second toothed member 54 is a toothed wheel rotating integrally with an end (the upper end in FIGS. 4-6) of the motor shaft 14.

In the embodiment shown, the first toothed member 52 is a toothed sector.

In the embodiment shown in FIGS. 4-6, the first toothed member 52 is formed on a sliding element 60, which is translatable along a direction parallel to a rotation axis of the second toothed member 54.

In particular, as shown in FIG. 5, the first toothed member 52 is formed on the sliding element 60, which is translatable on a sliding shaft 62.

The sliding element 60 is not rotatable about the sliding shaft 62.

For example, the sliding shaft 62 has a splined profile (not recognizable in FIGS. 4-6) and the sliding element 60 is provided with a hole 64 having a splined profile matching that of the sliding shaft 62.

The sliding shaft 62 has an end abutment 66.

A spring 68 acts by pushing on the sliding element 60 to bias it into the position against the end abutment 66.

In the embodiment shown, the spring 68 is a coil compression spring put on the sliding shaft 62, and the sliding element 60 is arranged between the end abutment 66 of the sliding shaft 62 and the spring 68. The other end of the spring 68 is suitably blocked in position, for example by the actuator 56 itself. For this purpose, another abutment may however be present.

The sliding shaft 62 is fixedly mounted on the motor gear 10, as better described hereinafter.

In the embodiment shown, the actuator 56 is an electromagnet.

The sliding element 60 carrying the first toothed member 52 comprises a ferromagnetic insert 74 arranged in the range of action of the electromagnet 56.

Alternatively, the entire sliding element 60 carrying the first toothed member 52 can be made of ferromagnetic material 74.

Preferably, the sliding element 60 has an elongated shape, the toothed sector 52 is made at a first longitudinal end of the sliding element 60, and the ferromagnetic insert 74 is made at a second longitudinal end of the sliding element 60, opposite the first.

The sliding element 60 is mounted cantilevered on the sliding shaft 62.

Preferably, the hole 64 having a profile matching that of the sliding shaft 62 is formed in the ferromagnetic insert 74.

Preferably, the spring 68 pushes on the ferromagnetic insert 74.

In the embodiment shown in FIGS. 4-6, the components of the electrically controllable device 50 described above are supported by a strap 70 that is tightened, through a bolt 72, on the case 16 of the electric motor 12 of the motor gear 10, in a suitable position to allow the engagement of the first and second toothed members 52, 54.

The electrically controllable device 50 could be fixed differently to the motor gear 10, for example it could be fixed to the casing 22 of the gear train 18.

Instead of being mounted on the sliding shaft 62, the translatable element 60 could be translatable on a rail.

When the electromagnet 56 is not active, the sliding element 60 carrying the first toothed member 52 is in the position shown in FIGS. 4 and 5, pushed by the spring 68 against the end abutment 66 of the sliding shaft 62.

In such a condition, the first toothed member 52 is engaged with the second toothed member 54.

In such a condition, the rotation of the motor shaft 14 is blocked because the second toothed member 54 integral therewith cannot draw the first toothed member 52 into rotation due to the anti-rotation coupling between the sliding shaft 62 having a splined profile and the hole 64 of the sliding element 60 carrying the first toothed member 52.

When the electromagnet 56 is actuated, it attracts the ferromagnetic insert 74 of the sliding element 60 carrying the first toothed member 52, which slides along the sliding shaft 62 against the pushing action of the spring 68, until the first toothed member 52 disengages from the second toothed member 54, as shown in FIG. 6.

In this condition, the motor shaft 14 is let free to rotate.

With the illustrated configuration, the electrically controllable device 50 has a stable state of blocking the rotation of the motor 12, and an unstable state of consent for rotation of the motor 12.

Advantageously, energy consumption is limited to the unstable state only, necessary during gearshifting only.

Alternative configurations are further devisable, wherein the state of blocking the rotation is unstable and the state of consent for rotation is stable, or wherein the two states are both unstable or both stable. Some configurations of the latter type are described hereinafter with reference to FIGS. 11-14.

In the embodiment shown in FIGS. 4-6, the gear train 18 comprises: a third toothed member or toothed wheel 24 coaxial with and rotating integrally with an end (the lower end in FIG. 4) of the motor shaft 14; a fourth toothed member or toothed wheel 26 engaged with the third toothed member; a fifth toothed member or toothed wheel 28 coaxial with and rotating integrally with the fourth toothed member 26; a sixth toothed member or toothed wheel 30 engaged with the fifth toothed member 28; a seventh toothed member or toothed wheel 32 coaxial with and rotating integrally with the sixth toothed member 30; an eighth toothed member or toothed wheel 34 engaged with the seventh toothed member 32; a ninth toothed member or toothed wheel 36 coaxial with and rotating integrally with the eighth toothed member 32; a tenth toothed member or toothed sector 38 engaged with the ninth toothed member 36 and coaxial with and rotating integrally with the hole 20 for the output shaft.

The speed reduction ratio between the motor shaft 14 and the output shaft of the motor gear 10 is given in a per se well known manner by the number of teeth of the various toothed members 24-38 of the gear train 18.

Preferably, the third toothed member 24 has a smaller diameter than the diameter of the fourth toothed member 26; the fifth toothed member 28 has a smaller diameter than the diameter of the fourth toothed member 26 and smaller than the diameter of the sixth toothed member 30; the seventh toothed member 32 has a smaller diameter than the diameter of the sixth toothed member 30 and smaller than the diameter of the eighth toothed member 34; the ninth toothed member 36 has a smaller diameter than the diameter of the eighth toothed member 34.

The rotation shafts of the toothed members, other supports and spacers are not described in detail since they are fully within the capabilities of a person skilled in the art. Furthermore, a bearing 35 is visible, that rotationally supports the shaft carrying the eighth and ninth toothed members 34, 36.

The gear train 18 can also comprise a remarkably different number of toothed members than what is shown, even down to only one gear formed by the first toothed member 24 coaxial with and rotating integrally with the end of the motor shaft 14, and by the toothed member or toothed sector 38 coaxial with and rotating integrally with the hole 20 for the output shaft, of course so positioned as to be engaged with each other.

The output shaft of the motor gear 10 is not necessarily parallel to the motor shaft 14, as shown. In alternative embodiments, they can be perpendicular, or even sloped by an angle different from a right angle.

The gear train 18 can comprise toothed members different from toothed wheels having straight teeth as shown. In alternative embodiments, for example, the gear train 18 can comprise one or more gears selected among worm screw gears, bevel gears, crown gears (with lateral toothing), gears with helical teeth, hypoid gears, etc.

The first and second toothed members 52, 54 of the electrically controllable device 50 can also have different teeth from straight teeth.

Figure 7:
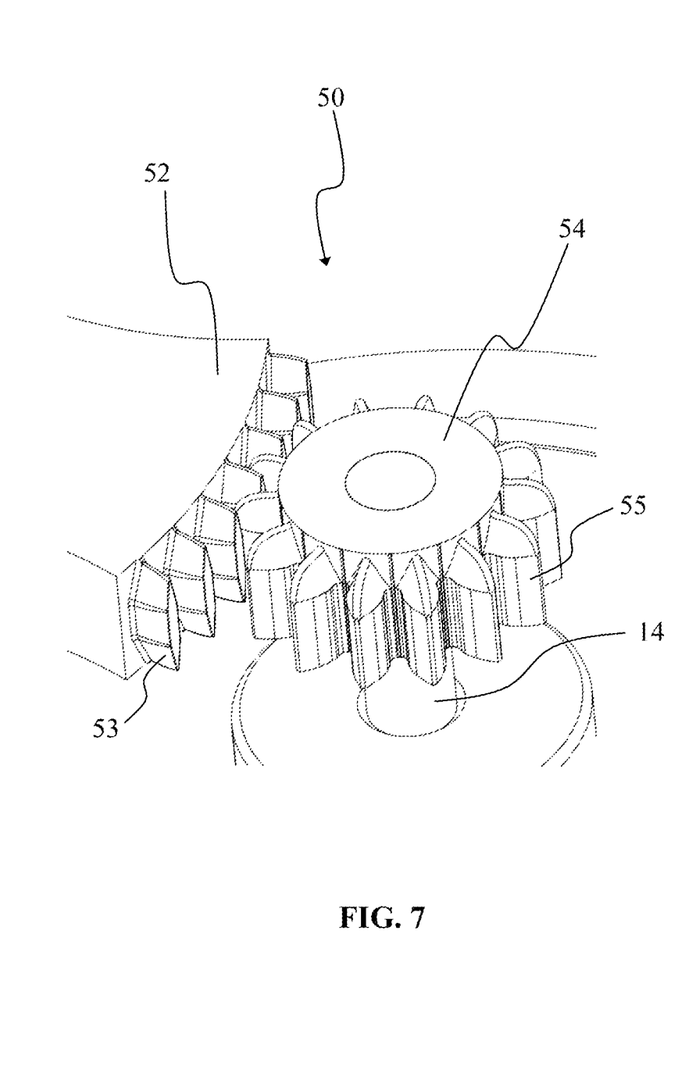
FIG. 7 is a detail of the electrically controllable device, in perspective view.

Advantageously, as highlighted in FIG. 7 they comprise self-engaging teeth 53, 55 so as to facilitate the engagement during the rotation of the motor shaft 14.

By arranging the second toothed member 54 rotating integrally with the motor shaft 14, the advantage is obtained that the angular position in which the motor shaft 14 is blocked is not particularly critical, because the chain guide 113, 114, displaced by the output shaft 127, 128 of the motor gear 117, 118, 10 (directly or through the linkage 119, 120), undergoes a much smaller displacement than the angular displacement of the motor shaft 14, by a factor equal to the reduction ratio of the gear train 18 of the motor gear 10. Furthermore, although the rotation speed of the motor shaft 14 and therefore of the second toothed member 54 is comparatively high, the torque that must be applied onto the second toothed member 54 to block the rotation of the motor shaft 14 is comparatively low.

The electrically controllable device 50 of the embodiment of FIGS. 4-6 is totally external to the protective casing 22 of the gear train 18, for which reason possible replacement interventions of the electrically controllable device 50 do not affect the gear train 18.

In the embodiment just described, the second toothed member 54 is an auxiliary toothed member, namely a toothed member that is not part of the kinematic chain embodied in the gear train 18.

Furthermore, such an arrangement is only one of the various ones possible. Some other embodiments are described hereinafter.

Figure 8:
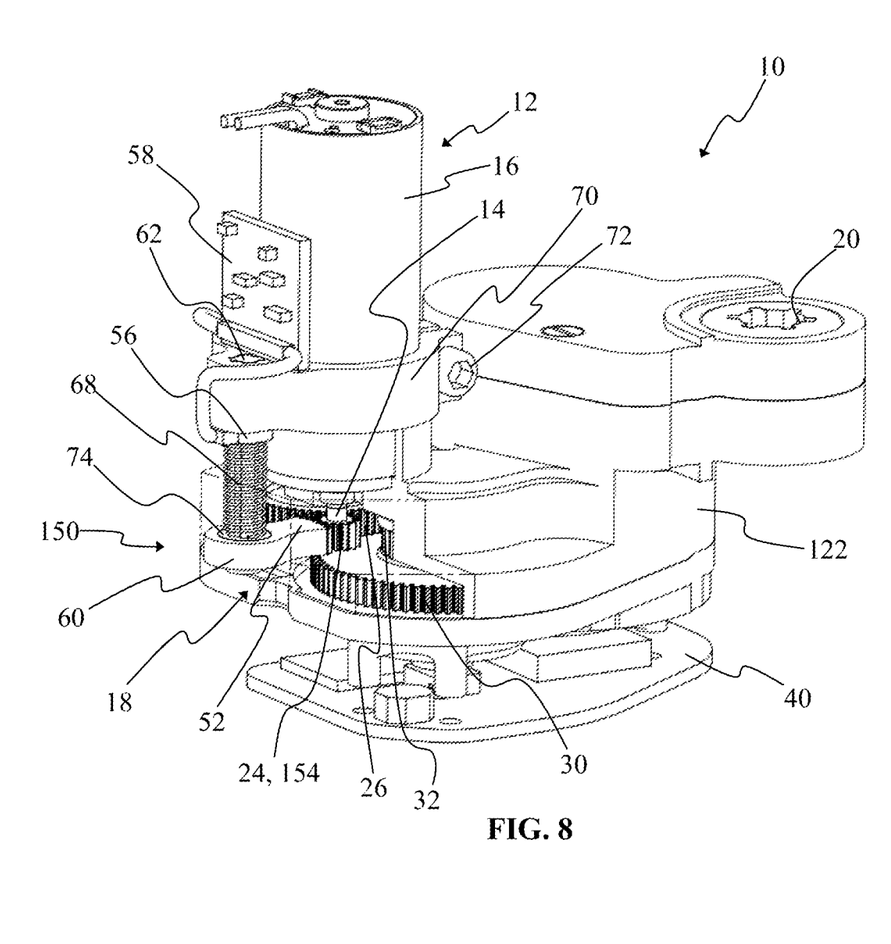
FIGS. 8-10 illustrate some other possible embodiments of a motor gear, with different locations of a toothed member of the electrically controllable device.

FIG. 8 shows an embodiment wherein the electrically controllable device, indicated therein with reference numeral 150, is mounted upside down with respect to the embodiment described above, and wherein the second member or toothed wheel, indicated therein with reference numeral 154, coincides with the third toothed member 24 integrally mounted with the motor shaft 14, which represents the first toothed member of the gear train 18.

The second member 154 is therefore one of the live toothed wheels 24-38 of the gear train 18, namely a toothed member that is an active part of the kinematic chain embodied in said gear train 18.

In this case the advantage is obtained that it is not necessary to provide an electric motor 12 having a motor shaft 14 exiting from the two ends of the case 16.

Furthermore, the sliding shaft 62 penetrates in the casing, indicated therein with reference numeral 122, and all of the toothed members 52, 154, 24-38, with relative lubricating fluid, can be advantageously confined with respect to the external environment, even in a tight manner.

In an embodiment not shown, the second member or toothed wheel 54 can be an auxiliary toothed member, integrally mounted with the motor shaft 14 on the same end as the third toothed member 24, which represents the first toothed member of the gear train 18, but not coinciding therewith.

Figure 9:
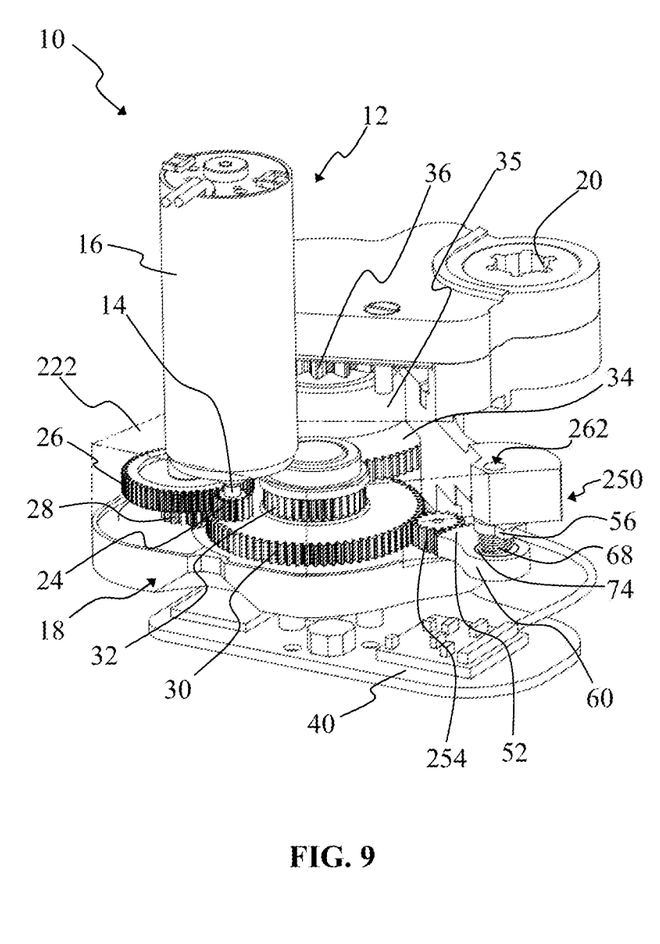

FIG. 9 shows an embodiment of an electrically controllable device 250, wherein the second toothed member 254 is a toothed wheel engaging one of the toothed wheels of the gear train 18, but external to the kinematic chain embodied within the gear train 18 between the motor shaft 14 and the output shaft. In this particular case, provided merely as an example, the second toothed member 254 engages the sixth toothed member 30 of the gear train 18.

The sliding shaft 262 is supported directly by the casing 222, and the electrically controllable device 250 is completely housed therein.

In other further alternative embodiments, the auxiliary toothed member—embodying the second toothed member—could be rotationally integral with a toothed member of the gear train 18, for example a toothed member coaxial with and rotating integrally with the sixth and the seventh toothed members 30, 32.

In further alternative embodiments, the second toothed member can be another of the live toothed wheels 24-38 of the gear train 18, namely a toothed member that is an active part of the kinematic chain embodied within said gear train 18, different from the third toothed member 24 integral with the motor shaft 14 as in the case of the embodiment of FIG. 8.

Figure 10:
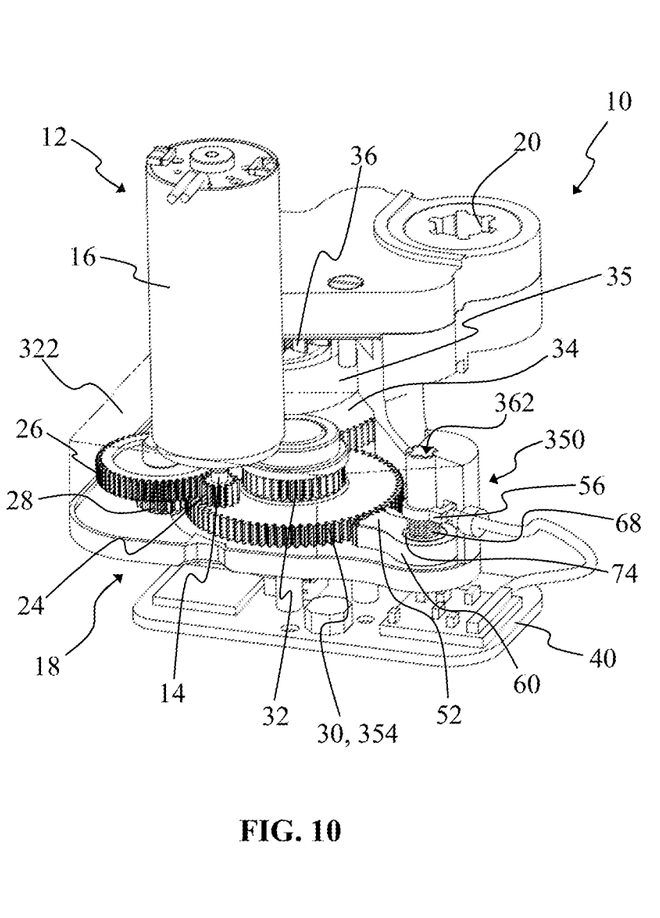

FIG. 10 shows, merely as an example, such an embodiment of an electrically controllable device 350, wherein the second toothed member, indicated therein with 354, coincides with the sixth toothed member 30 of the gear train 18.

Also in this case, the sliding shaft 362 is supported directly by the casing 322, and the electrically controllable device 350 is completely housed therein.

The actuator of the electrically controllable device is not necessarily an electromagnet 56. Some other embodiments of actuator will be described hereinafter. Even if reference will be made to the placement of the second toothed member 54 at the end of the motor shaft 14 opposite to that of the gear train 18 like in the embodiment of FIGS. 4-6, it should be understood that the various embodiments of actuator can also be used in the other embodiments of electrically controllable device described above.

Figure 11:
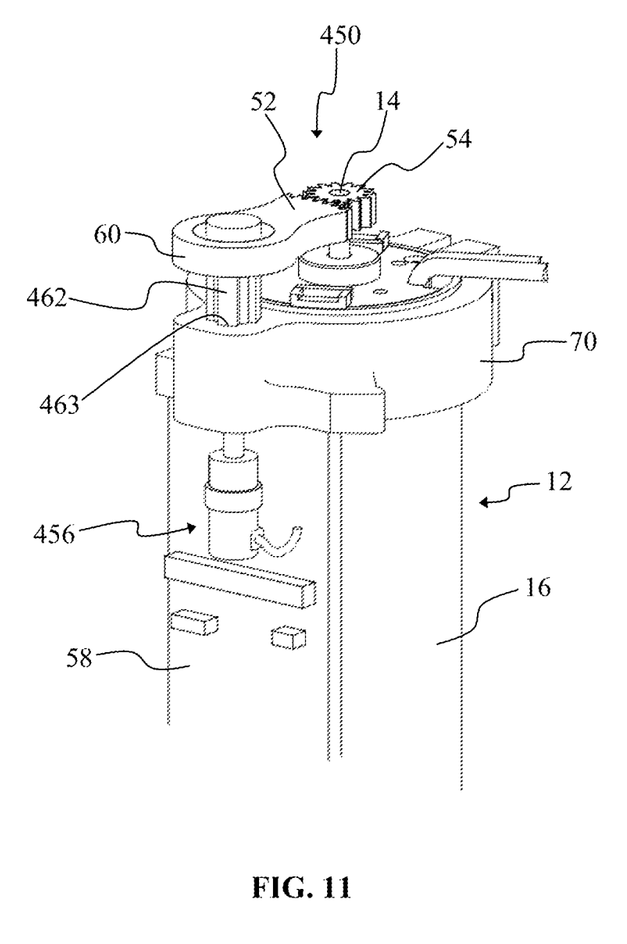
FIGS. 11-14 illustrate some other embodiments of an electric actuator of the electrically controllable device.

FIG. 11 shows an electrically controllable device 450 comprising, as electric actuator 456, a linear electric motor 456 to drive the translation of the first toothed member 52.

In this case, the translatable element 60 does not slide on a sliding shaft, rather it is fixed to a sliding shaft 462 inserted in a hole 463 of the strap 70—or of the support for fixing to the casing, or of the casing itself, in other embodiments. Sliding shaft 462 and respective hole 463 have a splined profile or other profile that does not allow reciprocal rotation.

The spring 68 is missing and the electrically controllable device comprises two stable states, one for blocking and one for consenting to the rotation of the motor 12 of the motor gear 10.

Alternatively, the actuator 456 could be a small air or hydraulic cylinder.

Figure 12:
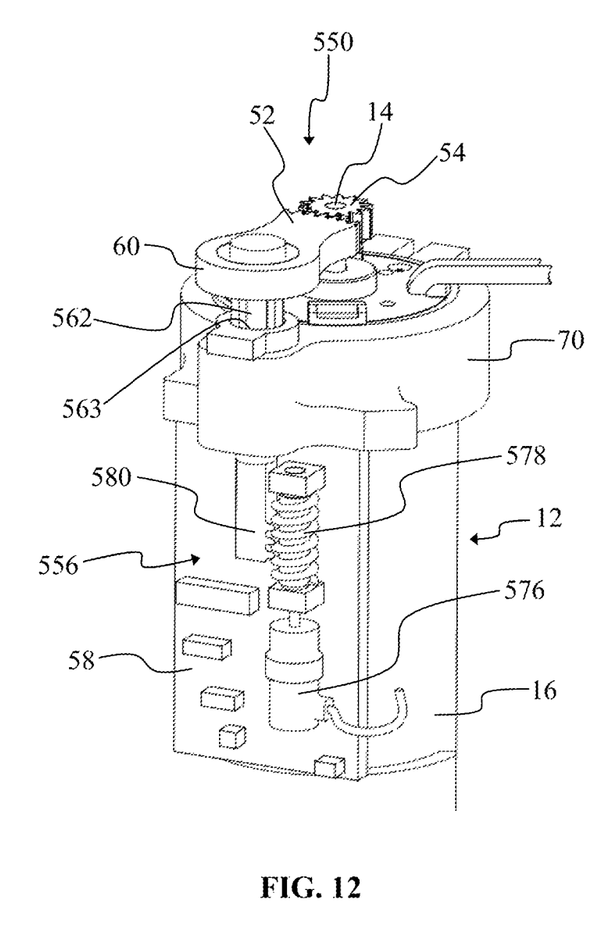
Figure 13:
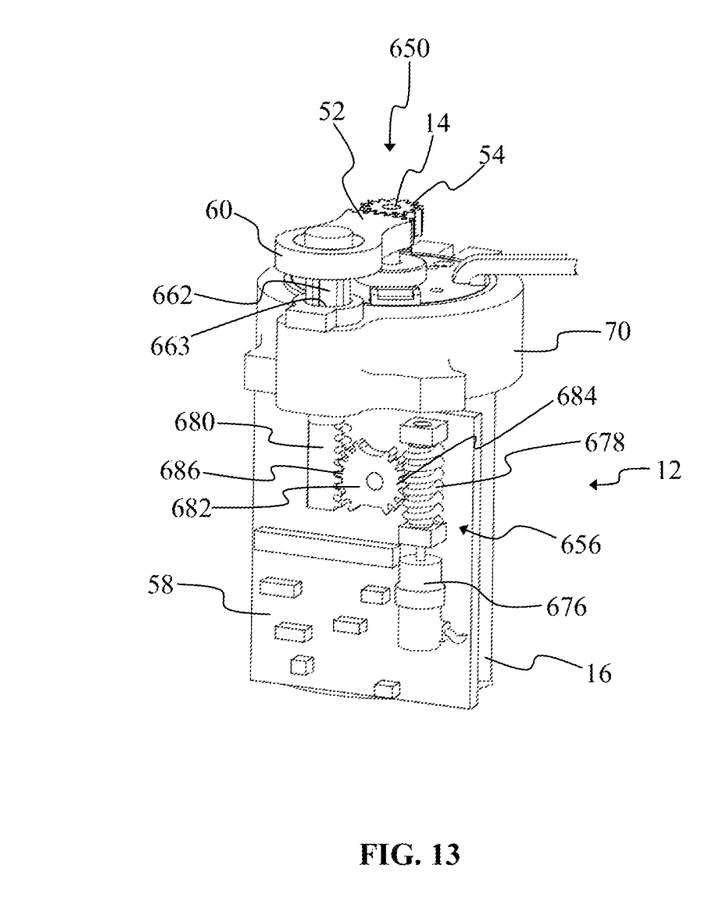
Figure 14:
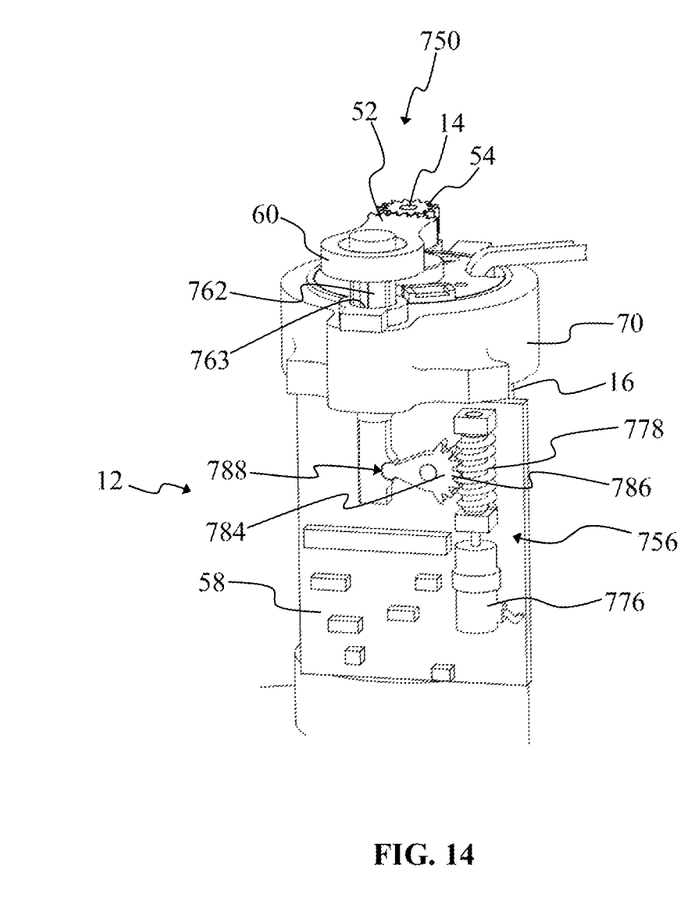

In other embodiments, like for example those shown in FIGS. 12-14, the electric actuator 556, 656, 756 of the electrically controllable device, respectively indicated therein with 550, 650, 750, comprises a rotary electric motor 576, 676, 776 with worm screw 578, 678, 778, and a member for converting motion from rotary to linear arranged between the worm screw 578, 678, 778 and the sliding shaft 562, 662, 762 carrying the first toothed member 52.

The member for converting motion from rotary to linear can be configured in any suitable manner, as those skilled in the art will understand the light of the present description.

Merely as an example, in the embodiment of FIG. 12, said member for converting motion from rotary to linear comprises a rack 580 integral with the shaft 562 of the first toothed member 52 and engaged with the worm screw 578.

In the embodiment of FIG. 13, said member for converting motion from rotary to linear comprises a rack 680 integral with the shaft 662 of the first toothed member 52, and a gear 682 engaged with the worm screw 678 and with the rack 680.

The gear 682 is a wheel fixed in a rotary manner (in the case shown, on the circuit board 58) and having two different toothed sectors 684, 686, with a different diameter, for engaging the worm screw 678 and the rack 680, respectively.

However, this is not necessary and it could have a single toothing. There could also be other toothed members to form a gear train between worm screw 678 and rack 680.

Still alternatively, the member for converting motion from rotary to linear could comprise a rack integral with the shaft of the first toothed member, and a bevel gear engaged with the rack and with the worm screw.

In the embodiment of FIG. 14, said member for converting motion from rotary to linear comprises an element 784 having a toothed sector 786 engaged with the worm screw 778, and a hinge coupling 788 with the shaft 762 carrying the first toothed member 52.

As an alternative to what is shown, it is possible to provide for a single controller, which comprises components housed on a single electronic board for controlling both the electrically controllable device 50, 150, 250, 350, 450, 550, 650, 750 and the electric motor 12—instead of on the two boards 40, 58.

Preferably, the controller—irrespective of whether it is made through components housed on a single board or on the two boards 40, 58—is configured to carry out the following steps:

a) receiving a gearshifting request signal;

b) making the electric motor 12 free to rotate, and in particular driving the electrically controllable device 50, 150, 250, 350, 450, 550, 650, 750 up to a condition of consent for rotation of the electric motor 12, c) driving the electric motor 12 to displace the chain guide 113, 114 until the chain guide 113, 114 is in an intended position, while the electric motor 12 is made free to rotate, i.e. while the electrically controllable device 50, 150, 250, 350, 450, 550, 650, 750 is in said consent condition, and d) blocking the rotation of the electric motor 12, and in particular driving the electrically controllable device 50, 150, 250, 350, 450, 550, 650, 750 up to a condition of blocking the rotation of the electric motor 12.

Preferably, in step c) the intended position is verified through an output signal of a sensor of the position of the chain guide 113, 114

In step a), the gearshifting request signal is entered manually by the cyclist through suitable control members, for example levers and/or buttons provided on the manual control device(s) 107 mounted on the handlebars 108 of the bicycle 100, and/or generated by the control electronics of the gearshift 110 of the bicycle.

Step b) and step d) take place for example by providing and removing a suitable excitation current or voltage to/from the electromagnet 56, in the case of the electrically controllable device 50, 150, 250, 350.

Preferably, the step of making the electric motor 12 free to rotate, and in particular of driving the electrically controllable device 50, 150, 250, 350, 450, 550, 650, 750 up to the condition of consent for rotation of the electric motor 12, comprises exciting the electrically controllable device 50, 150, 250, 350, 450, 550, 650, 750.

Preferably, the step of blocking the rotation of the electric motor 12, and in particular of driving the electrically controllable device 50, 150, 250, 350 up to a condition of blocking the rotation of the electric motor 12, comprises interrupting the excitation of the electrically controllable device 50, 150, 250, 350.

In this case, the return of the electrically controllable device 50, 150, 250, 350 into the condition of blocking the rotation of the electric motor 12 is automatic, in particular caused by the elastic return of the spring 68.

The reverse is however possible, for example by providing a spring that biases the sliding element 60 into the disengagement position.

As seen above, configurations are also possible wherein the electrically controllable device 450, 550, 650, 750 is excited both during the driving up to the condition of consent for rotation of the electric motor 12, and during the driving up to the condition of blocking the rotation of the electric motor 12.

In an embodiment, the step of blocking the rotation of the electric motor 12, and in particular of driving the electrically controllable device 50, 150, 250, 350 up to a condition of blocking the rotation of the electric motor 12, is carried out after the step of driving the electric motor 12.

In another embodiment, the step of blocking the rotation of the electric motor 12, and in particular of driving the electrically controllable device 50, 150, 250, 350 up to a condition of blocking the rotation of the electric motor 12, is carried out simultaneously with a final part of said step of driving the electric motor 12.

In the second case, it is possible to make a more accurate control of the engagement position of the first toothed member 52 and the second toothed member 54, 154, 254, 354, and therefore of the position maintained by the chain guide 113, 114 of the derailleur 111, 112, at the expenses of a greater complexity in the control algorithm.

The above is a description of various embodiments of inventive aspects, and further changes can be made without departing from the scope of the present invention. The shape and/or size and/or location and/or orientation of the various components can be changed. The functions of a component can be carried out by two or more components and vice-versa. Components shown directly connected to or contacting each other can have intermediate structures arranged between them. The details shown in a figure and/or described with reference to a figure or to an embodiment can apply in other figures or embodiments. Not all of the details shown in a figure or described in a same context have to necessarily be present in a same embodiment. Features or aspects that turn out to be innovative with respect to the prior art, alone or in combination with other features, should be deemed to be described per se, irrespective of what is explicitly described as innovative.

What is claimed is:

1. A derailleur of a bicycle comprising a chain guide, an electric motor that displaces the chain guide, and an electrically controllable device configured to selectively block the rotation of the electric motor and let the electric motor free to rotate.

2. The derailleur according to claim 1, wherein the motor is part of a motor gear further comprising at least one gear, and preferably a gear train.

3. The derailleur according to claim 1, wherein the electrically controllable device has a stable state of blocking of, and an unstable state of consent for, rotation of the motor.

4. The derailleur according to claim 1, further comprising a controller of the electrically controllable device and/or of the electric motor.

5. The derailleur according to claim 4, wherein the controller of the electric motor is respondent to a gearshifting request command.

6. The derailleur according to claim 5, wherein the derailleur further comprises a chain guide position sensor, and said controller of the electric motor is further respondent to the position sensor.

7. A derailleur of a bicycle comprising a chain guide, an electric motor that displaces the chain guide, and an electrically controllable device configured to selectively block the rotation of the electric motor and let the electric motor free to rotate, wherein the motor is part of a motor gear further comprising at least one gear, and preferably a gear train, wherein the electrically controllable device comprises a first toothed member and a second toothed member, the first toothed member being configured to selectively engage the second toothed member, the second toothed member being associated with the motor gear so that the rotation thereof is associated with the rotation of a motor shaft of the motor, as well as an electric actuator configured to displace the first toothed member into engagement and out of engagement with the second toothed member.

8. The derailleur according to claim 7, wherein said second toothed member rotates integrally with the motor shaft.

9. The derailleur according to claim 7, wherein said second toothed member is an auxiliary toothed member, namely a toothed member that is not part of a kinematic chain embodied by said at least one gear.

10. The derailleur according to claim 9, wherein said second toothed member rotates integrally with a first end of the motor shaft, said at least one gear comprising a third toothed member integral with a second end of the motor shaft opposite the first end.

11. The derailleur according to claim 9, wherein said second toothed member is engaged with a toothed member of said at least one gear.

12. The derailleur according to claim 7, wherein said second toothed member is a live toothed member of said at least one gear, namely a toothed member that is an active part of a kinematic chain embodied by said at least one gear.

13. The derailleur according to claim 7, wherein said first toothed member is formed on a sliding element that is translatable along a direction parallel to a rotation axis of the second toothed member.

14. The derailleur according to claim 7, wherein the first toothed member and the second toothed member of the electrically controllable device are housed within a casing of said motor gear.

15. The derailleur according to claim 7, wherein said first toothed member is an at least partially ferromagnetic element, and said electric actuator of said electrically controllable device comprises an electromagnet.

16. A method for actuating a bicycle derailleur comprising a chain guide, an electric motor that displaces the chain guide, and an electrically controllable device configured to selectively block rotation of the electric motor and let the electric motor free to rotate, comprising the steps of:
    receiving a gearshifting request signal,
    making the electric motor free to rotate,
    driving the electric motor to displace the chain guide until the chain guide is in an intended position while the electric motor is made free to rotate, and
    blocking the rotation of the electric motor.

17. The method according to claim 16, wherein the step of making the electric motor free to rotate comprises exciting an electrically controllable device configured to, selectively, block the rotation of the electric motor and let the electric motor free to rotate.

18. The method according to claim 16, wherein the step of blocking the rotation of the electric motor comprises interrupting excitation of the electrically controllable device configured to, selectively, block the rotation of the electric motor and let the electric motor free to rotate.

* * * * *